(12) United States Patent
Kollefrath et al.

(10) Patent No.: US 10,716,644 B2
(45) Date of Patent: Jul. 21, 2020

(54) DENTAL INSTRUMENT

(71) Applicant: COLTÈNE/WHALEDENT AG, Altstätten (CH)

(72) Inventors: Ralf Kollefrath, Ruethi (CH); Ulrich Müller, Au (CH); Martin Schlüter, Wangen i.A (DE)

(73) Assignee: COLTÈNE/WHALEDENT AG, Altstaetten (CH)

( * ) Notice: Subject to any disclaimer, the term of this patent is extended or adjusted under 35 U.S.C. 154(b) by 0 days.

(21) Appl. No.: 15/637,032

(22) Filed: Jun. 29, 2017

(65) Prior Publication Data
US 2018/0000558 A1 Jan. 4, 2018

(30) Foreign Application Priority Data
Jul. 4, 2016 (EP) .................................... 16177788

(51) Int. Cl.
*A61C 3/02* (2006.01)
*A61C 3/06* (2006.01)
(Continued)

(52) U.S. Cl.
CPC .................. *A61C 3/02* (2013.01); *A61C 3/06* (2013.01); *C25D 21/12* (2013.01); *C25D 21/18* (2013.01); *C22C 19/03* (2013.01)

(58) Field of Classification Search
CPC .... A61C 3/00; A61C 3/02; A61C 3/06; A61C 5/42; B24D 18/0054; B24D 3/342; B22F 2207/03; B23K 35/3033; C22C 26/00
(Continued)

(56) References Cited

U.S. PATENT DOCUMENTS 3,372,010 A * 3/1968 Parsons .................... B24D 3/08
228/121
3,751,283 A * 8/1973 Dawson ................ C23C 24/103
51/295
(Continued)

FOREIGN PATENT DOCUMENTS

DE 20 2005 005 701 U1 8/2006
DE 10 2014 212 448 A1 12/2015
(Continued)

OTHER PUBLICATIONS

PDF-https://www.thoughtco.com/chrome-and-chromium-differences-606141 (accessed on Feb. 13, 2018). (Year: 2018).*
(Continued)

*Primary Examiner* — Edward Moran
*Assistant Examiner* — Matthew P Saunders
(74) *Attorney, Agent, or Firm* — Davis & Bujold PLLC; Michael J. Bujold

(57) ABSTRACT

A dental instrument comprising a shaft and a working part adjoined thereto, with the working part having a coating in which abrasive bodies are embedded, is proposed, Firstly, the average proportion of the surface of the abrasive bodies which is covered by the coating can be at least 60%, preferably at least 65%, most preferably at least 70%. Secondly, the coating can, moreover, also consist of a nickel ahoy which additionally contains at least one element selected from the group consisting of titanium, vanadium, niobium, chromium, molybdenum, tungsten, manganese, iron and cobalt. In addition, a process for coating a working part, in particular for producing a dental instrument of this type, and also the use of such a dental instrument for cutting machining of solid bodies are proposed.

12 Claims, 2 Drawing Sheets

Figure 1:
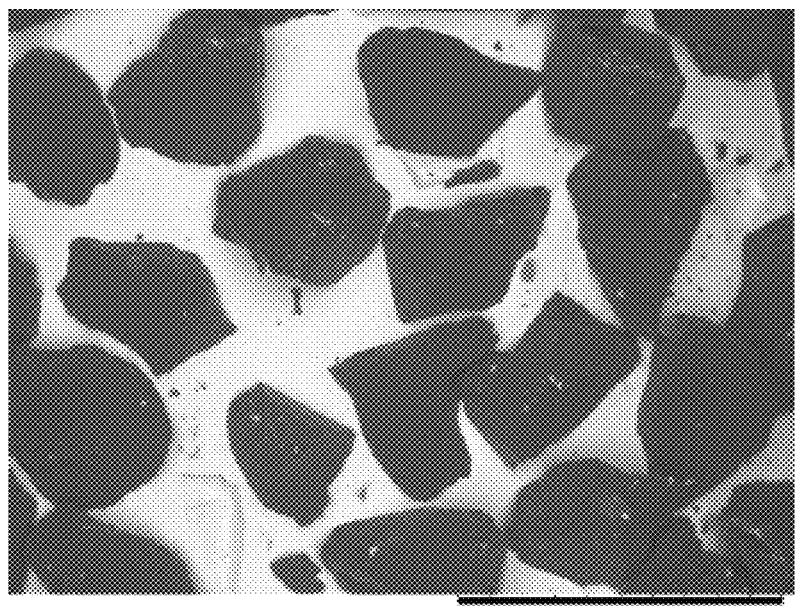

(51) Int. Cl.
*C25D 21/12* (2006.01)
*C25D 21/18* (2006.01)
*C22C 19/03* (2006.01)

(58) Field of Classification Search
USPC ....... 433/125, 142, 165, 166, 202.1, 51, 144
See application file for complete search history.

(56) References Cited

U.S. PATENT DOCUMENTS

| | | | | |
|---|---|---|---|---|
| 3,762,882 | A | 10/1973 | Grutza | |
| 3,894,673 | A * | 7/1975 | Lowder | B23K 1/19 125/39 |
| 4,381,227 | A * | 4/1983 | Narcus | C25D 5/14 205/110 |
| 4,483,108 | A * | 11/1984 | Howard | B24D 7/18 408/1 BD |
| 4,834,655 | A * | 5/1989 | Kyotani | A61C 3/02 433/166 |
| 4,931,363 | A * | 6/1990 | Slutz | B23K 31/025 228/121 |
| 5,190,796 | A * | 3/1993 | Iacovangelo | C23C 18/50 205/158 |
| 6,629,884 | B1 * | 10/2003 | Goers | B24B 53/017 451/540 |
| 7,201,645 | B2 * | 4/2007 | Sung | B24B 53/017 451/443 |
| 8,870,571 | B2 * | 10/2014 | Lowder | A61C 3/06 433/166 |
| 9,011,563 | B2 * | 4/2015 | Sung | B24D 3/06 51/293 |
| 9,221,154 | B2 * | 12/2015 | Sung | B24D 18/0054 |
| 9,409,280 | B2 * | 8/2016 | Sung | B01J 3/062 |
| 9,868,100 | B2 * | 1/2018 | Sung | B01J 3/062 |
| 9,987,727 | B2 * | 6/2018 | Wiand | B24D 3/06 |
| 2001/0033804 | A1 * | 10/2001 | An | B24B 53/017 419/8 |
| 2002/0037490 | A1 * | 3/2002 | Oyamada | A61C 3/02 433/165 |
| 2003/0099916 | A1 * | 5/2003 | McLean | A61C 5/42 433/102 |
| 2004/0018468 | A1 * | 1/2004 | Gorokhovsky | A61B 17/1615 433/166 |
| 2004/0063068 | A1 | 4/2004 | Ikushima et al. | |
| 2005/0263171 | A1 * | 12/2005 | Wu | B24B 1/00 134/6 |
| 2007/0111161 | A1 * | 5/2007 | Strauss | A61C 3/06 433/166 |
| 2007/0259307 | A1 * | 11/2007 | Quan | A61C 3/00 433/25 |
| 2008/0023230 | A1 * | 1/2008 | Cho | B23B 51/02 175/432 |
| 2013/0089833 | A1 * | 4/2013 | Schoen | A61C 3/02 433/142 |
| 2013/0183636 | A1 * | 7/2013 | Lowder | A61C 3/06 433/166 |
| 2015/0297318 | A1 * | 10/2015 | Wiand | A61C 3/02 433/166 |
| 2016/0003064 | A1 * | 1/2016 | Stratton | B23K 35/0244 416/241 R |

FOREIGN PATENT DOCUMENTS

| | | |
|---|---|---|
| EP | 2 578 180 A1 | 4/2013 |
| WO | 92/07664 A1 | 5/1992 |

OTHER PUBLICATIONS

Sharon C. Siegel et al., "Dental Cutting: The Historical Development of Diamond Burs", Journal of American Dental Association, vol. 129, Jun. 1998, pp. 740-745.

Xinyu Zhang et al., "Co-electrodeposition of hard Ni-W/diamond nanocomposite coatings", Scientific Reports, 6:22285, DOI:10.1038, Feb. 29, 2016 pp. 1-11.

H.M. Zhou et al., "A Ni/surface-modified Diamond Composite Electroplating Coating on Superelastic NiTi Alloy as Potential Dental Bur Design", Materials Science Forum, vol. 610-613, 2009, pp. 1339-1342.

Roman A. Khmelnitsky et al., "Heteroepitaxy of Ni-Based Alloys on Diamond", Crystal Growth & Design, American Chemical Society, DOI: 10.1021, Jan. 12, 2016, pp. A-H.

Nihon Kagaku Sangyo Co. Ltd., "Wide range of applications High Purity Product, Nickel Sulfamate", Dec. 2014.

Yu Zhang et al., "Development of Partially Ni-coated Diamond Abrasives for Electroplated Tools", Ritsumeikan University, College of Science and Engineering, Feb. 4, 2014.

Stefan Kölle et al., "Nickel-Legierungsschichten für extreme Einsatzbedingungen—Projektzwischenbericht", Ulmer Gespräch, vol. 8./9., May 2014.

European Search Report Corresponding to 16177788.3 dated Mar. 20, 2017.

European Search Report Corresponding to 16177788.3 dated Dec. 19, 2016.

\* cited by examiner

DENTAL INSTRUMENT

The present invention relates to a dental instrument comprising a shaft and a working part adjoined thereto, a process for coating the working part, in particular for producing a dental instrument, and also the use of a dental instrument for the cutting machining of an object according to the preambles of the independent claims.

Rotating dental instruments are differently configured tools which are clamped into dental angle pieces, handpieces or turbines. In addition, such instruments are also used in dental technology in conjunction with the handpieces customary there. They are made up of an actual working part and a shaft which serves to fasten and drive the working part. Depending on the intended use, both the shaft and the working part can have different shapes or be made of different materials. Important features affecting the quality of such dental instruments are the sharpness or material hardness thereof and also the rotation accuracy thereof. They can be intended for one-off or for repeated use, with longevity being an important quality feature particularly in the case of repeated use.

Materials used for the working parts are, depending on the particular application, steel, hard metal, diamond, ceramic or elastic polymers. Diamond-plated instruments in particular have become established for some decades in dentistry. These are used first and foremost for machining the dental enamel, i.e. in the preparation of teeth for fitting of dental crowns or installation of fillings. Such dental instruments are used there in combination with dentists' turbines and specific, fast-running angle piece heads. However, they are also used in dental technology, in particular for machining particularly hard workpieces made of ceramic.

In their article "*Dental cutting: The historical development of dental burs*" in the *Journal of the American Dental Association* (1939), issue 129, 1998, pages 740-745, Siegel and Fraunhofer give a historical review of the development of diamond-plated dental instruments. According to this article, such instruments usually comprise a core of stainless steel which is coated with a nickel coating in which abrasive grades of diamond are embedded. Coating of the steel core with the nickel layer is carried out in the majority of cases by electroplating in which a codeposition of the nickel and the diamond grains occurs. A nickel-containing electrolyte solution, usually containing nickel sulphamate, is used for this purpose. The diamond grains are suspended in this. It is possible to use both natural and synthetic diamond grains, with natural diamond grains having become established in dentistry.

However, such dental instruments suffer from the problem that the diamond grains break out from the nickel layer during use. This leads to rapid wear or blunting of the instrument, which greatly limits the life of the instrument. In addition, there is the problem, particularly in the case of instruments of this type used in dentistry, that abrasive bodies detached from the working part or parts of the coating can get into the tissues of a patient. In addition, gradual wear of the instrument leads to a continual change in its characteristics, which makes handling difficult for the dentist or dental technician.

It is therefore an object of the present invention to overcome the disadvantages of the prior art.

In particular, it is an object of the present invention to provide a versatile dental instrument which is low in wear and simple to handle. The instrument should be able to be produced inexpensively and particularly in large numbers.

These objects are achieved by a dental instrument, a process for coating a working part, in particular for producing a dental instrument, and by the use of a dental instrument, which have the features in the independent claims.

The dental instrument comprises a shaft and a working part adjoined thereto, with the working part having a coating in which abrasive bodies are embedded. The average proportion of the surface of the abrasive bodies which is covered by the coating is at least 60%, preferably at least 65%, most preferably at least 70%. However, this average proportion can also be at least 75%, preferably at least 80%, most preferably at least 85%.

It goes without saying that these percentages relate only to abrasive bodies which are at least partly uncovered (definitive abrasive bodies). In the present context, the "average proportion of the surface of the abrasive bodies which is covered by the coating" is the arithmetic mean of the covered proportions over these definitive abrasive bodies. For a single abrasive body, the covered proportion is the percentage of the total surface which is covered by the coating which likewise covers the working part.

This high degree of embedding of the abrasive bodies in the coating enables breaking-out of these abrasive bodies during use to be reduced. A longer life of the dental instrument can be achieved thereby. In addition, the properties thereof change to a significantly lesser extent over its life, as a result of which handling is simplified.

Regardless of the average proportion of the surface of the abrasive bodies which is covered by the coating, the coating in such a dental instrument can consist of a nickel alloy which additionally contains at least one element selected from the group consisting of vanadium, niobium, chromium, molybdenum, tungsten, manganese, iron and cobalt.

Alloys having such a composition likewise avoid breaking-out of the abrasive bodies from the coating. This can, on the one hand, be achieved by means of a higher mechanical resistance. However, this can also be the result of the abrasive bodies being covered better by the coating. Accordingly, such a dental instrument also has significantly more constant characteristics over its life, as a result of which handling is simplified.

If the nickel alloy contains tungsten, the proportion of tungsten in the alloy can be from 0.1 to 10% by weight, preferably from 1 to 5% by weight, most preferably from 2 to 3% by weight. These proportions of tungsten lead to particularly advantageous properties in respect of wear and handling.

The shaft and the working part can consist of a hard metal, a metal or a metal alloy, in particular a stainless steel alloy. In particular, a stainless steel alloy is easy to machine, comparatively inexpensive and has a high mechanical strength and also good corrosion resistance.

The abrasive bodies can consist of a material selected from the group consisting of diamond, tungsten carbide and boron nitride. These are particularly hard materials which display advantageous abrasive properties. The abrasive bodies can consist of natural and/or synthetic diamond. Furthermore, the abrasive bodies can consist of monocrystalline and/or polycrystalline diamond grains. It has been found that a mixture of two different synthetic grains of different types is particularly advantageous. In particular, good abrasive behaviour has been able to be achieved using a mixture of monocrystalline diamond grains, which have a particularly long life, and polycrystalline diamond grains, which display a particularly aggressive cutting behaviour.

The abrasive bodies can have a sieved grain size in accordance with ISO 6106-2006 of D251 (60/70), D213

(70/80), D181 (80/100), D151 (100/120), D126 (120/140), D107 (140/170), D91 (170/200), D76 (200/230), D64 (230/270), D54 (270/325), D46 (325/400) or D252 (60/80), with preference being given to D151 (100/120), D126 (120/140) and D107 (140/170). These grain sizes enable a particularly advantageous abrasive behaviour to be achieved, in particular in respect of the longevity of the dental instrument. If a mixture of different types of abrasive bodies is used, these can also have different sieved grain sizes.

The abrasive bodies can have an approximately spherical geometry or an ellipsoidal geometry. The use of ellipsoidal abrasive bodies and/or mixtures of different grain sizes enables a higher packing density of the abrasive bodies to be achieved.

The dental instrument can, in particular, be rotationally symmetric and be suitable for the rotational cutting machining of solid bodies, in particular dental enamel, dentine, ceramic materials, polymer materials, hard metals, metals and alloys. Although the present invention is in no way restricted to rotating dental instruments, the surface coating described is particularly advantageous there, in particular in respect of the abrasive behaviour.

A further aspect of the present invention relates to a process for coating a working part, in particular for producing a dental instrument as described above, which comprises the steps:
provision of a working part;
provision of an electrolyte solution in which abrasive bodies are suspended;
dipping of the working part into the electrolyte solution;
electrochemical deposition of a coating on the working part in such a way that the abrasive bodies are embedded in the coating.

A nickel salt and a salt of an element selected from the group consisting of vanadium, niobium, chromium, molybdenum, tungsten, manganese, iron and cobalt are dissolved in the electrolyte solution. In the context of the process described, the abrasive bodies can have the same features as described above in relation to the dental instrument.

The said process makes it possible to produce dental instruments in which the embedding of the abrasive bodies in the electrochemically deposited layer is significantly improved. Nevertheless, the abrasive bodies are not covered with an excessive thick nickel layer as occurs, for example, in the case of abrasive bodies of diamond which have been precoated with nickel. Since the nickel alloys produced using the above-described process are harder than a normal nickel coating, a robust bond to the abrasive bodies can be achieved. Corresponding dental instruments have particularly advantageous properties, in particular in respect of longevity and abrasive behaviour.

A nickel salt, preferably nickel sulphamate, nickel sulphate or nickel chloride, and sodium polytungstate can be dissolved in the electrolyte solution. The pH of the electrolyte solution can be less than 7, preferably less than 6, most preferably less than 5. Dental instruments having particularly advantageously properties as have been described above can be produced using such an electrolyte solution. In addition, such electrolyte solutions are suitable for repeated use, as a result of which the production costs for the dental instruments can be reduced.

A further aspect of the present invention relates to the use of a dental instrument as described above for the rotational cutting machining of solid bodies, in particular dental enamel, dentine, ceramic materials, polymer materials, hard metals, metals and alloys.

Further advantages and individual features of the invention can be derived from the following description of a working example and from the figures.

Figure 2:
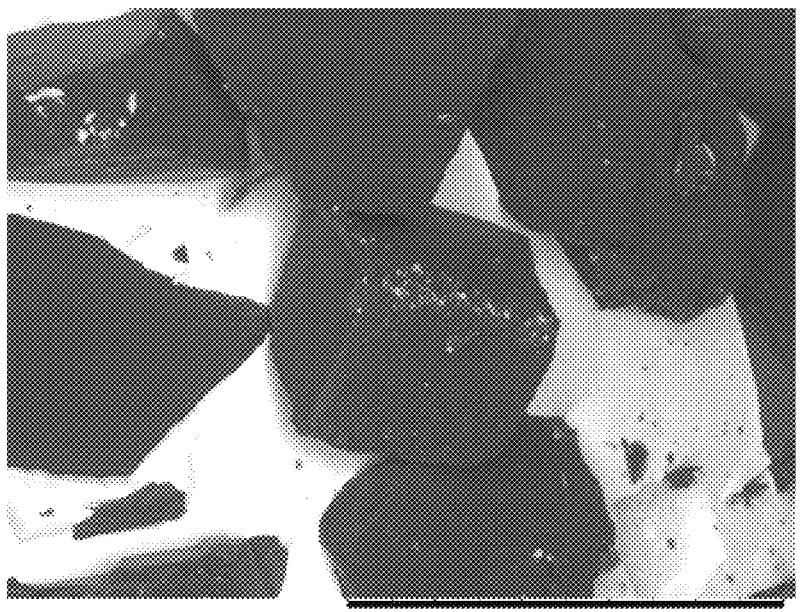
Figure 3:
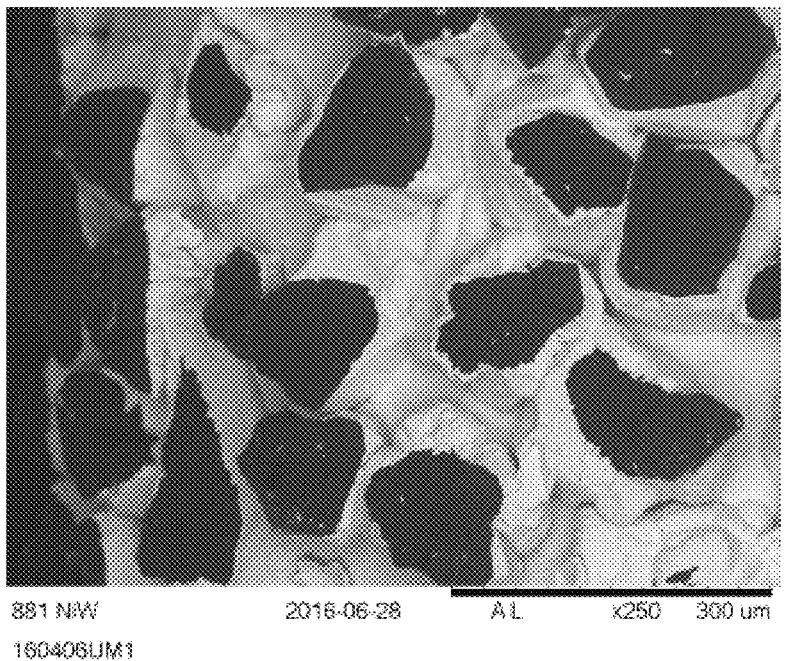
Figure 4:
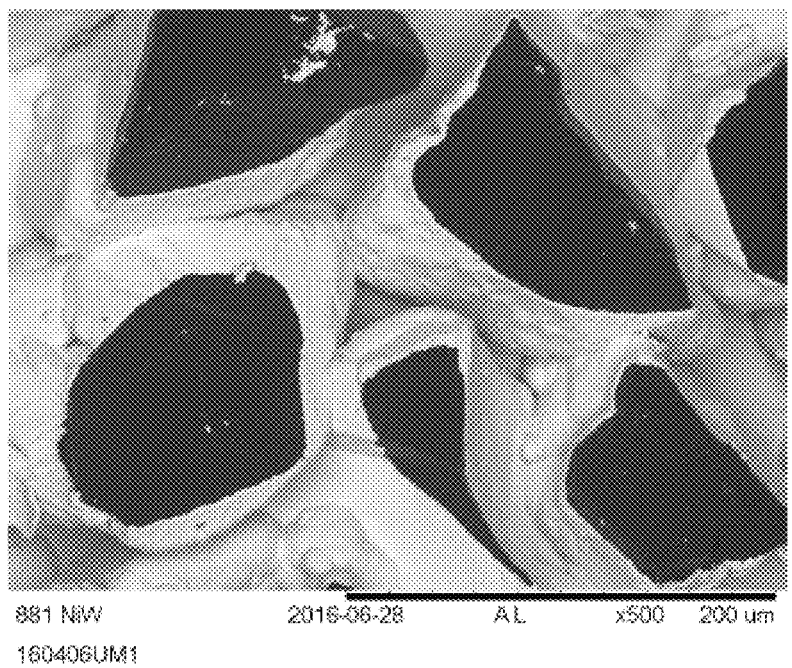

The Figures Show:

FIGS. 1 and 2: micrograph of the working part of a dental instrument from the prior art;

FIGS. 3 and 4: micrograph of the working part of a dental instrument according to the invention.

In the following table, a process according to the invention for coating the working part for producing a dental instrument as described above is compared with a process from the prior art. While the electrolyte in the prior art is based on nickel sulphamate, sodium polytungstate has been additionally added to it in the process of the invention. This leads to the electrochemically deposited layer containing about 2-3% by weight of tungsten in addition to nickel. Furthermore, natural diamond grains were suspended in the electrolyte in the process of the prior art. In the process of the invention, on the other hand, a synthetic diamond mixture comprising monocrystalline (resistant) diamond grain and polycrystalline diamond grain (which display very effective cutting) were used. Apart from the improved properties of the dental instrument produced using the process of the invention, the tungsten-containing electrolyte has the additional advantage that it is suitable for multiple use, as a result of which the production costs for a dental instrument according to the invention can be reduced.

| Parameter | Prior Art | Invention |
|---|---|---|
| pH | 3.5-4.3 opt. 4.0 | 3.5-4.3 opt. 4.0 |
| Density | 26-29 Bè | 26-29 Bè |
| Temperature | 50 ± 5° C. | 50 ± 5° C. |
| Nickel* | 60-100 g/l | 40-60 g/l |
| Tungsten** | 0 | 1-10 g/l |
| Boric Acid | 40-45 g/l | 40-45 g/l |
| Sodium Citrate | 0 | 60-80 g/l |
| Nickel Chloride | 3.5-4.0 g/l | 3.5-4.0 g/l |
| Diamond | Natural | Synthetic diamond mixture comprising monocrystalline and polycrystalline diamond grains |
| Grain Size | 100/120, 120/140, 140/170 | 100/120, 120/140, 140/170 |
| Wetting Agent | 20 ml | 20 ml |
| Brightener | 40 ml | 40 ml |
| Bath Volume | 27 l | 27 l |

*calculated as metal; used as nickel sulphamate
**calculated as metal; used as sodium polytungstate monohydrate FIGS. 1 and 2 show micrographs in an enlargement of 250× and 500× of a dental instrument from the prior art. It can be seen that the embedding of the abrasive bodies composed of diamond in the electrochemical nickel coating is rather unsatisfactory. Accordingly, the diamond grains can break out during use, leading to rapid wear of the instrument.

FIGS. 3 and 4 show micrographs in an enlargement of 250× and 500× of a dental instrument according to the invention. It can be seen that the embedding of the diamond grains in the metal matrix is significantly better. Thus, the average proportion of the surface of the abrasive bodies which is covered by the coating is above 60%. The diamond grains are held significantly better in the metal matrix as a result. They break out to a significantly lesser extent during use of the dental instrument, as a result of which this displays slower wear and constant characteristics over its life. Furthermore, an advantageous abrasive behaviour can be achieved using the mixture of two synthetic diamond grains. A diamond grain is a monocrystalline diamond particle which has a high durability. The other is a multicrystalline diamond particle which displays significantly more aggressive cutting behaviour and self-sharpening properties.

The invention claimed is:

1. A dental instrument comprising: a shaft, a working part adjoined thereto, and the working part consisting of a metal, a metal ahoy, or a stainless steel ahoy, and the working part having a single coating in which abrasive bodies are embedded such that the single coating with abrasive bodies is directly in contact with the working part, and at least 15% of a surface of the abrasive bodies is not covered by the single coating, wherein the coating comprises a nickel ahoy which additionally contains tungsten, which is free of chromium.

2. The dental instrument according to claim 1, wherein a proportion of tungsten in the nickel alloy is from 0.1 to 10% by weight.

3. The dental instrument according to claim 2, wherein the proportion of tungsten in the nickel ahoy is from 1 to 5% by weight.

4. The dental instrument according to claim 3, wherein the proportion of tungsten in the nickel ahoy is from 2 to 3% by weight.

5. The dental instrument according to claim 1, wherein the shaft consists of one of a metal or a metal alloy.

6. The dental instrument according to claim 5, wherein the shaft consists of a stainless steel alloy.

7. The dental instrument according to claim 1, wherein the abrasive bodies consist of a material selected from the group consisting of diamond, tungsten carbide, boron nitride, corundum and corundum varieties.

8. The dental instrument according to claim 7, wherein the abrasive bodies consist of at least one of natural and synthetic diamond.

9. The dental instrument according to claim 7, wherein the abrasive bodies consist of at least one of monocrystalline and polycrystalline diamond.

10. The dental instrument according to claim 1, wherein the abrasive bodies have a sieved grain size, in accordance with ISO 6106-2006, of D251 (60/70), D213 (70/80), D181 (80/100), D151 (100/120), D126 (120/140), D107 (140/170), 091 (170/200), D76 (200/230), D64 (230/270), D54 (270/325), D46 (325/400) or D252 (60/80).

11. The dental instrument according to claim 1, for rotational cutting machining of solid bodies.

12. A dental instrument comprising: a shaft, a working part adjoined thereto, and the working part consisting of a metal alloy; or a stainless steel alloy, and the working part having a single coating in which abrasive bodies are embedded such that the single coating with abrasive bodies is directly in contact with the working part, and at least 15% of a surface of the abrasive bodies is not covered by the single coating, wherein the coating comprises a nickel alloy which contains tungsten but is free of chromium.

* * * * *